United States Patent Office 2,776,974
Patented Jan. 8, 1957

2,776,974

DI-(LOWER ALKYL) CYCLOHEXYLAMINE SALTS OF 2,5-DIMETHYLPIPERAZINE-1,4-DICARBODITHIOIC ACID

John J. D'Amico, Charleston, and Marion W. Harman, Nitro, W. Va., assignors to Monsanto Chemical Company, St. Louis, Mo., a corporation of Delaware No Drawing. Application April 7, 1954,
Serial No. 421,679

2 Claims. (Cl. 260—268)

This invention relates to 2,5-dimethyl-1,4-piperazinedicarbodithioic acid and its derivatives. The new compounds may be represented by the general structural formula

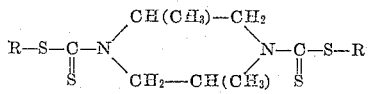

where R represents a salt forming group, an amido group or a saturated thio ether group. The latter term is used in a broad sense to include compounds in which the sulfur is linked to a carbon atom of a saturated organic radical.

The free acid is unstable at ordinary temperatures but salts and other derivatives are stable. Salts are obtained by reacting 1 mole of 2,5-dimethylpiperazine and 2 moles of carbon bisulfide in the presence of an organic or inorganic base. From the salts other derivatives are produced as for example by reacting with dialkyl thiocarbamyl halides, alkyl halides, substituted alkyl halides or amines in the presence of oxidizing agents.

The following examples illustrate the invention in detail. The 2,5-dimethylpiperazine used was essentially the trans isomer.

EXAMPLE 1

To a stirred solution containing 35 parts by weight (0.3 mole) of 2,5-dimethylpiperazine, 96 parts by weight (0.6 mole) of 25% aqueous sodium hydroxide and 400 ml. of water was added dropwise 46 parts by weight (0.6 mole) of carbon disulfide at 10–20° C. over a period of 15 minutes. The ice-bath was removed and the solution was stirred at room temperature for 30 minutes longer. The water was removed by heating the solution on a steam bath and finally the solid was dried at 70° C. for 48 hours. The product was obtained as the trihydrate in 91.4% yield and possessed a melting point above 297° C. Analysis gave 34.45% sulfur and 7.86% nitrogen as compared to 35.17% sulfur and 7.68% nitrogen calculated for $C_8H_{12}N_2S_4Na_2.3H_2O$.

EXAMPLE 2

40 parts by weight (0.11 mole) of disodium 2,5-dimethyl-1,4-piperazinedicarbodithioate trihydrate, prepared as above, was dissolved in 600 ml. of water and 15 parts by weight (0.11 mole) of zinc chloride dissolved in 600 ml. of water was added thereto with stirring. After stirring for an hour, the solid was filtered, washed with water until the washings were neutral to litmus and air dried at 50° C. The zinc, 2,5-dimethyl-1,4-piperazinedicarbodithioate was obtained in 99.1% yield and possessed a melting point above 298° C. Analysis gave 8.52% nitrogen and 19.62% zinc as compared to 8.49% nitrogen and 19.82% zinc calculated for $C_8H_{12}N_2S_4Zn$.

EXAMPLE 3

A 15.4% solution of the product of Example 1 was prepared by adding 200 grams of water to 36.5 parts by weight (0.1 mole) of disodium 2,5-dimethyl-1,4-piperazinedicarbodithioate trihydrate and stirring for one-half hour. To this solution was added substantially 25.65 parts by weight (0.1 mole) of cadmium sulfate, $3CdSO_4.8H_2O$, dissolved in 1,000 ml. of water. The mixture was stirred for an hour, then the solid was filtered, washed with water until the washings were neutral to litmus and air dried at 50° C. The cadmium 2,5-dimethyl-1,4-piperazinedicarbodithioate was obtained in 98.3% yield and possessed a melting point above 298° C. Analysis gave 7.65% nitrogen, 33.90% sulfur and 29.99% cadmium as compared to 7.43% nitrogen, 34.03% sulfur and 29.83% cadmium calculated for $C_8H_{12}N_2S_4Cd$.

The cadmium sulfate was replaced by 24.97 parts by weight (0.1 mole) of $CuSO_4.5H_2O$ in the foregoing example to obtain copper 2,5-dimethyl-1,4-piperazinedicarbodithioate in 97.5% yield, M. P. above 298° C. Analysis gave 9.21% nitrogen and 18.82% copper as compared to 8.54% nitrogen and 19.38% copper calculated for $C_8H_{12}N_2S_4Cu$.

Replacing cadmium sulfate by 26.3 parts by weight (0.1 mole) of $NiSO_4.6H_2O$ in Example 3 resulted in substantially quantitative yield of nickel 2,5-dimethyl-1,4-piperazinedicarbodithioate which melted above 298° C. Analysis gave 17.44% nickel as compared to 18.16% nickel calculated for $C_8H_{12}N_2S_4Ni$.

Replacing cadmium sulfate by 33.12 parts by weight (0.1 mole) of $Pb(NO_3)_2$ in Example 3 resulted in substantially quantitative yield of lead 2,5-dimethyl-1,4-piperazine dicarbodithioate, M. P. 266–271° C. with decomposition. Analysis gave 6.25% nitrogen, 26.94% sulfur and 43.48% lead as compared to 5.94% nitrogen, 27.19% sulfur and 43.93% lead calculated for $C_8H_{12}N_2S_4Pb$.

EXAMPLE 4

To a stirred solution containing 35 parts by weight (0.3 mole) of 2,5-dimethylpiperazine, 77 parts by weight (0.6 mole) of N,N-dimethylcyclohexylamine, and 800 ml. of acetone was added dropwise 46 parts by weight (0.6 mole) of carbon disulfide at 10–20° C. over a 30 minute period. The ice-bath was removed and the reaction mixture was stirred for an additional hour. The solid was filtered and air dried at 50° C. The product, M. P. 164–166° C. was obtained in 83.5% yield. Analysis gave 11.20% nitrogen and 24.65% sulfur as compared to 10.76% nitrogen and 24.62% sulfur calculated for $C_{24}H_{48}N_4S_4$.

EXAMPLE 5

To a stirred solution containing 11.4 parts by weight (0.1 mole) of 2,5-dimethylpiperazine, 32 parts by weight (0.2 mole) of 25% aqueous sodium hydroxide and 200 ml. of water was added dropwise 15.2 parts by weight (0.2 mole) of carbon disulfide at 10–20° C. in 15 minutes. After stirring for one hour longer, 30.3 parts by weight (0.2 mole) of N,N-diethylthiocarbamyl chloride was added. The stirred reaction mixture was heated at 55–60° C. for 90 minutes, cooled to room temperature, the solid collected by filtration, washed with water until the washings were neutral to litmus, and dried at 50° C. The bis(diethylthiocarbamyl)-2,5-dimethyl-1,4-piperazinedithiocarbonyl sulfide, M. P. 157–162° C., was obtained in 92.5% yield. After recrystallization from benzene, it melted at 173–174° C. Analysis gave 11.14% nitrogen as compared to 11.28% nitrogen calculated for $C_{18}H_{32}N_4S_6$.

EXAMPLE 6

A solution containing 35 parts by weight (0.33 mole) of sodium carbonate in 140 parts by weight of water was added to 47.3 parts by weight (0.25 mole) of monochloroacetic acid until a pH of 8 was obtained. This solution was added dropwise to 468 parts by weight (0.25 mole) of disodium 2,5-dimethyl-1,4-piperazinedicarbodithioate aqueous solution over a 15 minute period. An exothermic reaction set in, causing the temperature to rise from 26 to 31° C. The resulting solution was stirred at room temperature for 24 hours. To this stirred solution 71 parts by weight of concentrated sulfuric acid was added and immediately a solid formed. The reaction mixture was stirred for one hour longer, the solid collected by filtration, washed with water until the washings were neutral to litmus and dried at 50° C. The bis(carboxymethyl)2,5 - dimethyl - 1,4 - piperazinebis(carbodithioate), M. P. 215–217° C., was obtained in 94.1% yield. Analysis gave 7.70% nitrogen and 33.55% sulfur as compared to 7.32 nitrogen and 33.52% sulfur calculated for $C_{12}H_{18}N_2O_4S_4$.

EXAMPLE 7

To 468 parts by weight (0.25 mole) of disodium 2,5-dimethyl-1,4-piperazinedicarbodithioate aqueous solution was added 98.3 parts by weight (0.50 mole) of a 40% aqueous solution of chloroacetaldehyde over a 15 minute period. An exothermic reaction set in causing the temperature to rise from 27 to 40° C. The reaction mixture was stirred for 24 hours, the solid collected by filtration, washed with water until the washings were neutral to litmus and dried at 50° C. The bis(formylmethyl)-2,5-dimethyl-1,4-piperazinebis(carbodithioate), M. P. above 298° C., was obtained in 90.4% yield. Analysis gave 8.00% nitrogen and 35.37% sulfur as compared to 7.99% nitrogen and 36.58% sulfur calculated for $C_{12}H_{18}N_2O_2S_4$. The product was insoluble in water, ether, acetone, chloroform, benzene, heptane, ethyl alcohol and ethyl acetate.

EXAMPLE 8

To a stirred solution containing 72.9 parts by weight (0.2 mole) of disodium 2,5-dimethyl-1,4-piperazinedicarbodithioate trihydrate, 128 parts by weight (0.8 mole) of 25% sodium hydroxide, 198 parts by weight (2.0 moles) of cyclohexylamine and 700 ml. of water was added dropwise 102 parts by weight of iodine dissolved in 600 ml. of water containing 102 parts by weight of potassium iodide at 25–30° C. over a two hour period. The reaction mixture was stirred for one-half hour longer, the solid collected by filtration, washed with water until the washings were neutral to litmus and air dried at room temperature. The S,S' - [2,5 - dimethyl - 1,4 - piperazinebis(thiocarbonyl)]bis(N-cyclohexylhydrosulfamine), M. P. 152–154° C., was obtained in 26.8% yield. Analysis gave 12.19% nitrogen as compared to 12.16% nitrogen calculated for $C_{20}H_{36}N_4S_4$.

The new compounds comprise useful intermediates and herbicides. When applied as either a foliage spray or pre-emergence disodium 2,5-dimethyl-1,4-piperazinedicarbodithioate proved to be an active herbicide. They also comprise accelerators for the vulcanization of natural and synthetic rubber and have other uses. For example, the adhesion of rayon tire cord to rubber is increased by treating the cord with bis(carboxymethyl)-2,5-dimethyl-1,4-piperazinebis(carbodithioate) or bis(formylmethyl)-2,5-dimethyl-1,4 - piperazinebis(carbodithioate). Salts of 2,5-dimethyl-1,4-piperazinedicarbodithioate are useful adjuvants for the vulcanization of Butyl rubber, a copolymer of isobutylene and a small proportion of a diene. Their activity in this polymer is considerably more pronounced than in natural rubber. For example, stocks were compounded comprising

| Stock | A | B | C | D | E | F |
|---|---|---|---|---|---|---|
| | Parts by weight | | | | | |
| Butyl rubber | 100 | 100 | 100 | 100 | 100 | 100 |
| Carbon black | 54 | 54 | 54 | 54 | 54 | 54 |
| Zinc oxide | 5 | 5 | 5 | 5 | 5 | 5 |
| Stearic acid | 1 | 1 | 1 | 1 | 1 | 1 |
| Sulfur | 1.5 | 1.5 | 1.5 | 1.5 | 1.5 | 1.5 |
| Cadmium 2,5-dimethyl-1,4-piperazinedicarbodithioate | 6.0 | | | | | |
| Copper 2,5-dimethyl-1,4-piperazinedicarbodithioate | | 6.0 | | | | |
| Lead 2,5-dimethyl-1,4-piperzinedicarbodithioate | | | 6.0 | | | |
| Nickel 2,5-dimethyl-1,4-piperazinedicarbodithioate | | | | 6.0 | | |
| Bis (N,N-dimethylcyclohexylamine) salt of 2,5-dimethyl-1,4-piperazinedicarbodithioic acid | | | | | 6.0 | |
| Bis (diethylthiocarbamyl)-2,5-dimethyl-1,4-piperazine-dithiocarbonyl sulfide | | | | | | 6.0 |

On curing the stocks for 60 minutes at 330° F. the following physical properties were obtained:

*Table I*

| Stock | Modulus of Elasticity in lbs./in.² at Elongation of 700% | Tensile at Break in lbs./in.² | Ultimate Elongation, Percent |
|---|---|---|---|
| A | 1,310 | 1,310 | 700 |
| B | 1,015 | 1,015 | 700 |
| C | | 1,525 | 670 |
| D | 980 | 1,080 | 790 |
| E | 1,630 | 1,720 | 740 |
| F | | 1,425 | 645 |

A stock comprising— Parts by weight
Butyl rubber _____ 100
Carbon black _____ 54
Zinc oxide _____ 5
Stearic acid _____ 1
Sulfur _____ 1.5
Mercaptobenzothiazole _____ 0.5
S,S' - [2,5 - dimethyl - 1,4 - piperazinebis(thiocarbonyl)]bis(N-cyclohexylhydrosulfamine) ___ 1.0 after heating for 30 minutes in a press at 330° F. exhibited physical properties as follows:

*Table II*

| Modulus of Elasticity in lbs./in.² at Elongation of 500% | Tensile at Break in lbs./in.² | Ultimate Elongation, Percent |
|---|---|---|
| 1,215 | 1,845 | 735 |

It is intended to cover all changes and modifications of the examples of the invention herein chosen for purposes of disclosure which do not constitute departures from the spirit and scope of the invention.

What is claimed is:

1. A compound of the structure

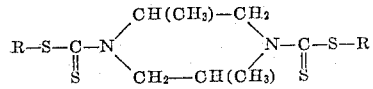

where R represents an N,N-di-(lower alkyl) N-cyclohexyl ammonium salt forming group.

2. Bis(N,N-dimethylcyclohexylamine) salt of 2,5-dimethyl-1,4-piperazinedicarbodithioic acid.

References Cited in the file of this patent

UNITED STATES PATENTS 2,414,014   Cable et al. _____ Jan. 7, 1947